Sept. 4, 1956 W. J. TULL 2,761,219
GYROMAGNETIC COMPASS
Filed Nov. 14, 1945
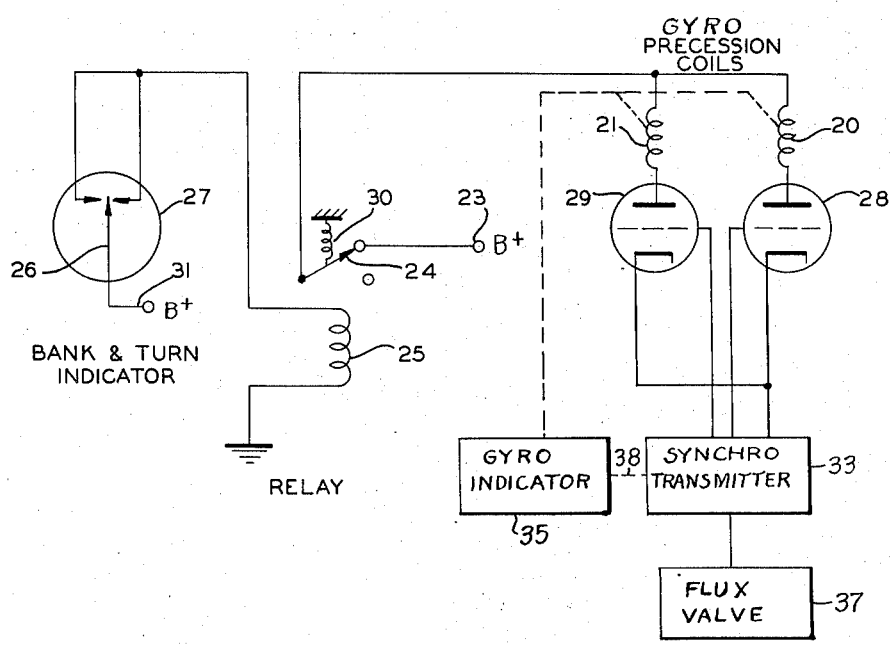
INVENTOR
WILLIAM J. TULL
BY
Ralph L Chappell
ATTORNEY

United States Patent Office 2,761,219
Patented Sept. 4, 1956

2,761,219

GYROMAGNETIC COMPASS

William J. Tull, Cambridge, Mass., assignor, by mesne assignments, to the United States of America as represented by the Secretary of the Navy Application November 14, 1945, Serial No. 628,602

3 Claims. (Cl. 33—222)

This invention relates to a method and means for eliminating the effects of acceleration errors normally occuring in the operation of a gyro-magnetic compass, and more particularly to a system for automatically removing errors introduced by angular acceleration of the craft upon which the compass is mounted.

An object of this invention is to provide a gyro-magnetic compass having means responsive to angular acceleration of the craft upon which the compass is mounted for operatively disconnecting the flux element and the precession coils of the compass.

Another object of this invention is to provide a gyromagnetic compass having the precession coils thereof electrically connected to a voltage source with acceleration responsive means for electrically disconnecting the precession coils from the source.

A particular object of this invention is to provide a gyro-magnetic compass in which the precession coils thereof are normally electrically connected to a voltage source, with means responsive to a predetermined amount of angular acceleration for electrically disconnecting the precession coils from the voltage source.

A more particular object of this invention is to provide a gyro-magnetic compass having the precession coils thereof normally electrically connected to a voltage source with a switch associated with a turn and bank indicator for electrically disconnecting the precession coils from the voltage source during intervals in which the angular acceleration of the craft on which the compass is mounted exceeds a predetermined amount.

Other objects and advantages of this invention as well as its construction, arrangement, and operation will be apparent from the following description and claims in connection with the accompanying drawing, in which the figure is a schematic diagram of the invention as contemplated by this invention.

The gyro-magnetic compass, which is well known to those skilled in the art, is schematically shown in the drawing and consists of four essential components: a flux valve 37, a gyro-magnetic indicator 35, an amplifier represented by tubes 28 and 29, and a power source here shown as terminal 23. Gyro precession coils 20, 21 are normally part of the indicator 35 and, hence, a mechanical connection is indicated by the broken lines between those parts. A synchro or "selsyn" transmitter 33 is normally mechanically coupled to the indicator 35, and this is indicated by the broken line 38. This compass is the type of compass in which a flux element is mounted on a pendulum damped in a liquid. The element is free to swing with a period (½ to ⅓ second) which is fast relative to roll, pitch, and turning of the craft on which the compass is mounted, but which is slow compared to most of the vibration frequencies imparted by the craft. There is thus provided a flux element which swings in the earth's magnetic field giving an average indication which is approximately the true heading of the aircraft, this heading being the heading of the craft with respect to the magnetic North.

The construction of the gyro-magnetic compass includes an electrically driven gyroscope having the axis of rotation of the gyroscope placed in a horizontal position and which is provided with a vertical indicator shaft, represented by line 38, having a synchro transmitter 33 fitted thereto. Two precession coils 20, 21 are mounted at right angles to the indicator shaft on the gimbals of the gyroscope. Compass information from the flux valve 37 is transmitted to the synchro transmitter, and whenever an error signal occurs between the indicator shaft and the flux valve, this error signal is applied to a pair of differential amplifiers and the proper precession coil is energized, thereby turning the gyro until the error has been corrected. Since the gyroscope is a very stable, long-time constant unit, it is possible for it to indicate heading and to measure turns entirely independently of the flux valve as a reference. That is, it is only because the gyro drifts as a result of the earth's rotation, bearing torque, and other factors that it is necessary to correct the gyro to a magnetic reference.

In summary, the gyro-magnetic compass consists of a horizontal gyroscope which is maintained in proper orientation by a magnetic element mounted on a pendulum, the function of the gyro being to average readings received from the magnetic element and to maintain a steady heading. If the flux valve is operatively disconnected from the gyroscope, the gyro will continue to indicate proper heading but will gradually drift off possibly at a rate of five to ten degrees per hour.

During a turn, or at other times of acceleration, the magnetic pendulous element of the gyro-magnetic compass swings out, thereby causing the gyroscope to give an erroneous indication of heading. The consequence of this error is of great importance when used with devices which continuously integrate the output of the compass. Such a device is a ground position indicator which presents erroneous position information on its dials as a result of temporary compass errors. The amount of this error depends upon the amount of tilt of the magnetic element and the length of time it is tilted. In order to eliminate this error, it is necessary to operatively disconnect the flux valve control from the gyro during turns or other times of acceleration. The drift error for a normal turn when the flux valve has been disconnected is approximately one-third of a degree, which is much less than the error introduced by the flux valve during a turn. Therefore, the gyro continues to indicate a much more accurate heading during a turn and immediately afterwards, than would be indicated should the flux valve remain operative thereby transmitting incorrect correction information to the gyro.

A further discussion of the construction and performance results of such a compass are noted in Massachusetts Institute of Technology Radiation Laboratory Report No. 712 by W. J. Tull, dated April 30, 1945, and entitled "Flight Behavior of the Flux Gate and Gyrosyn Compasses and Their Effects on G. P. I."

A still further discussion of such a gyroscope is to be found in the Transactions section of the November 1944 issue of "Electrical Engineering" in an article by O. E. Esval, entitled "The Gyrosyn Compass."

This invention provides a method and means for automatically operatively disconnecting the flux valve and gyroscope of the gyro-magnetic compass during turns or other periods of acceleration of the craft. Referring to the drawing, there is shown a schematic diagram of a system for attaining the above-mentioned purpose. A pair of gyro precession coils 20 and 21 normally are energized by a suitable voltage source 23 through a switch 24 which is normally retained in a closed position by a spring 30. A relay 25 is electrically connected to a suitable switch 26 associated with a turn and bank indicator 27. A pair of differential amplifiers 28 and 29 which preferably consist of a pair of triode tubes having the plates thereof connected to precession coils 20 and 21 and the grid-cathode circuit connected to the selsyn transmitter 33 on the shaft of indicator 35, normally govern the operation of the precession coils.

In operation, switch 26 is designed to close in response to a predetermined amount of angular acceleration of the aircraft. That is to say, switch 26 will be closed whenever the aircraft makes a turn at a rate greater than a preset amount. Closing of switch 27 energizes relay 25 from a suitable voltage source 31, thereby opening switch 24 and removing the plate voltage from the differential amplifiers governing the operation of the precession coils and electrically disconnecting coils 20 and 21 from voltage source 23. In this manner, the flux valve 37 is operatively disconnected from the precession coils at all times during which the rate of turn of the aircraft exceeds a predetermined amount. It will readily be understood that switch 24 will remain closed by action of spring 30 and will therefore electrically connect precession coils 20 and 21 and the plates of differential amplifiers 28 and 29 to voltage source 23 at all times except when relay 25 is energized by action of switch 26. While a turn and bank indicator has been illustrated as the means of sensing banks and turns thus providing a controlling mechanism for operatively disconnecting the precession coils from the flux valve, other means, such as a vertical gyroscope may as readily be used to operatively disconnect the precession coils from the flux valve.

Although a particular embodiment of this invention has been disclosed and described, it is to be understood that various changes and modifications may be made in this invention without departing from the spirit and scope thereof as set forth in the appended claims.

What is claimed is:

1. In combination with a gyro-magnetic compass having precession coils thereof electrically connected to a voltage source, a switch disposed between said coils and said voltage source, a relay for opening said switch when energized, and a second switch operatively associated with a turn and bank indicator for energizing said relay.

2. In a gyro-magnetic compass system of the type including a gyro indicator having precession coils electrically connected to a potential source, the improvement comprising, a switch interposed between said precession coils and said potential source and normally permitting energization of said coils, a relay, said relay when energized causing said switch to isolate said coils from said potential source, and angular acceleration responsive means having a second switch associated therewith, said second switch being coupled to said relay and adapted to energize said relay in response to a predetermined minimum amount of angular acceleration.

3. In a gyro-magnetic compass system of the type including a gyro indicator having gyro precession coils, a synchro transmitter mechanically coupled to said gyro indicator, a flux valve electrically coupled to said synchro transmitter, an amplifier responsive to signals from said synchro transmitter for energizing said precession coils, and a potential source connected through said precession coils to said amplifier, the improvement comprising a normally closed switch interposed between said precession coils and said potential source, a relay, said relay when energized causing said switch to open and isolate said potential source from said precession coils, and a second switch controlled by an acceleration responsive means, said second switch being connected to said relay and adapted to energize said relay.

References Cited in the file of this patent

UNITED STATES PATENTS

| | | |
|---|---|---|
| 2,357,319 | Esval et al. | Sept. 5, 1944 |
| 2,371,626 | Kecskemeti | Mar. 20, 1945 |
| 2,414,448 | Carter | Jan. 21, 1947 |
| 2,478,956 | Webber | Aug. 16, 1949 |

FOREIGN PATENTS

| | | |
|---|---|---|
| 517,551 | Great Britain | Feb. 1, 1940 |